United States Patent [19]

Jackson

[11] Patent Number: 4,603,664

[45] Date of Patent: Aug. 5, 1986

[54] MAGNETIC STRUCTURE FOR USE IN A CHAIN SAW OR EDGE TRIMMER IGNITION SYSTEM OR THE LIKE

[75] Inventor: Robert V. Jackson, Los Angeles, Calif.

[73] Assignee: McCulloch Corporation, Los Angeles, Calif.

[21] Appl. No.: 703,544

[22] Filed: Feb. 20, 1985

[51] Int. Cl.$^4$ ............................................. F02P 1/00
[52] U.S. Cl. ................................ 123/149 D; 310/153; 123/599
[58] Field of Search .................... 123/599, 149 D, 600, 123/601; 310/70 R, 70 A, 153

[56] References Cited

U.S. PATENT DOCUMENTS

| | | | |
|---|---|---|---|
| 3,527,266 | 9/1970 | Santi | 123/149 D |
| 3,577,971 | 5/1971 | Cauil | 123/149 D |
| 3,903,863 | 9/1975 | Katsumata | 123/149 D |
| 3,974,815 | 8/1976 | Katsumata | 123/599 |
| 4,074,669 | 2/1978 | Cauil | 123/599 |
| 4,120,277 | 10/1978 | Ehlen | 123/599 |
| 4,146,806 | 3/1979 | Katsumata | 123/149 D |
| 4,195,241 | 3/1980 | Moller | 123/149 D |
| 4,202,305 | 5/1980 | Wolf | 123/599 |

Primary Examiner—Ronald B. Cox
Attorney, Agent, or Firm—Murray and Whisenhunt

[57] ABSTRACT

A magnetic structure for use in a chain saw or edge trimmer ignition system or the like where the ignition system includes a flywheel having a plurality of cooling fins disposed around the peripheral portion thereof and at least one magnetic structure embedded in the periphery, a magnetically permeable core disposed adjacent the flywheel, a coil wound on the core and connected to an ignition circuit so that a voltage waveform is induced in the coil and applied to the circuit each time the magnetic structure passes the coil, the magnetic structure including (a) a magnet having first and second end faces and (b) first and second pole pieces which respectively engage the end faces, the pole pieces being asymmetrical in a plane perpendicular to the plane of the flywheel to thereby effect concentration of the flux produced by the magnet and coupled to the core by the pole pieces to thereby permit a reduction in size of the magnet without substantially lessening the energy in the voltage waveform applied to the ignition circuit and an increase in the size of those cooling fins disposed adjacent the reduced size magnet. The pole pieces may also be asymmetrical in the plane of the rotor.

21 Claims, 12 Drawing Figures

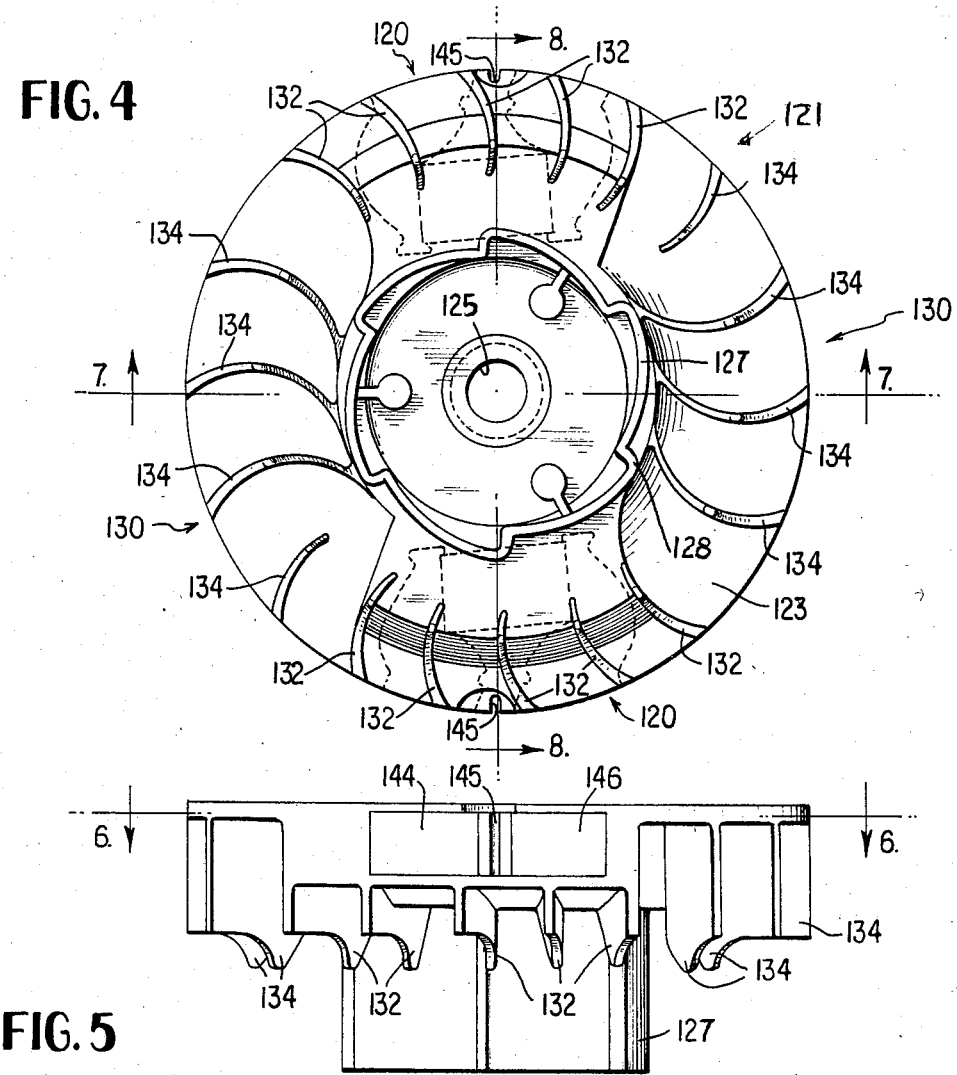
FIG. 4
FIG. 5
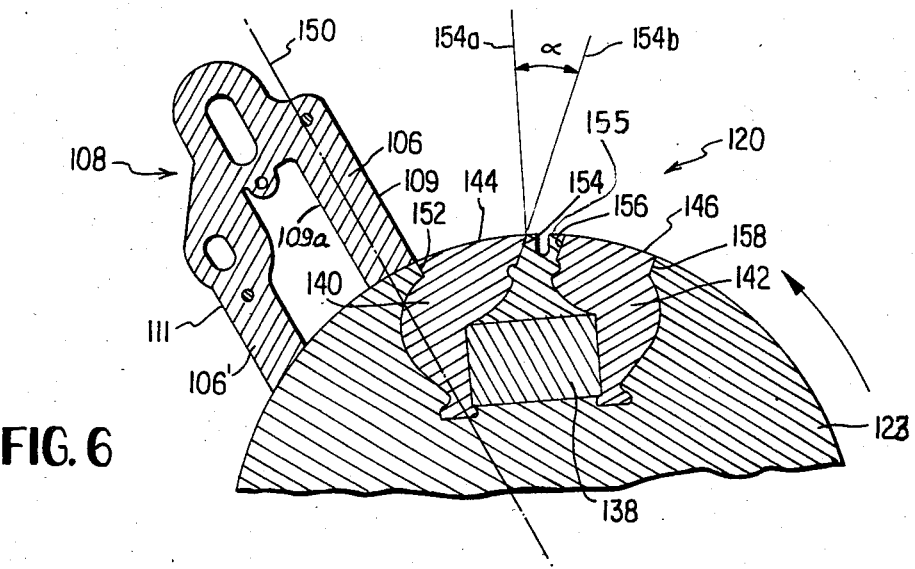
FIG. 6

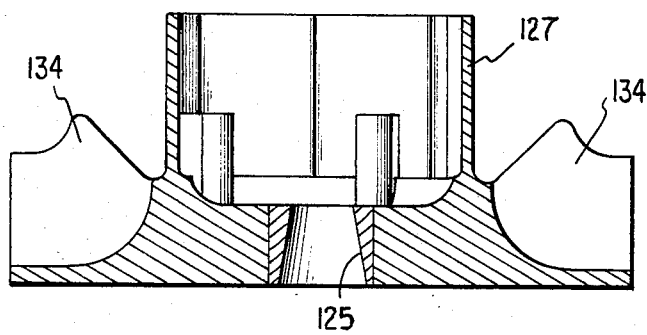
FIG. 7
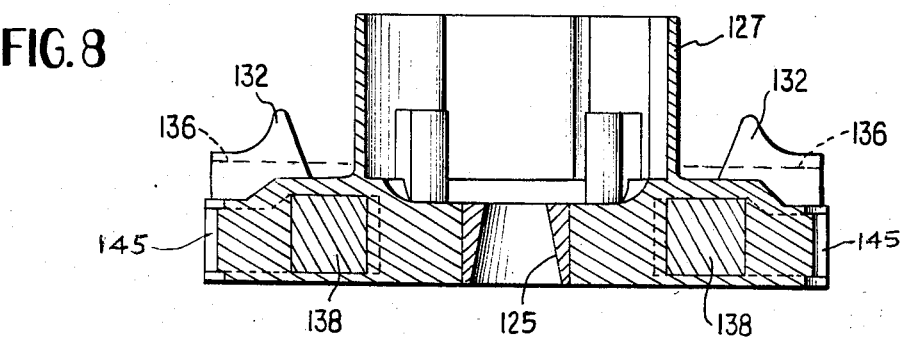
FIG. 8
FIG. 9
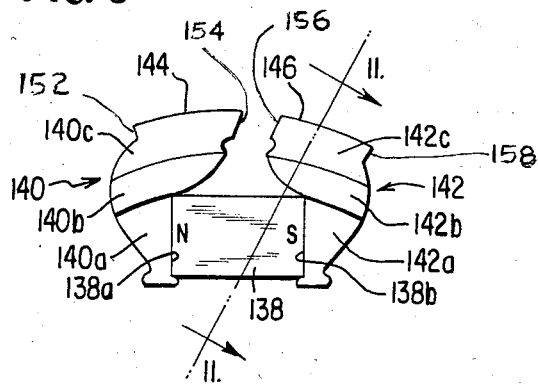
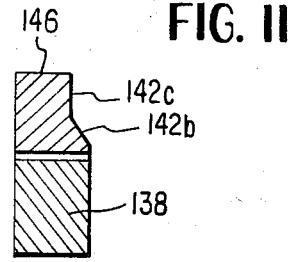
FIG. 11
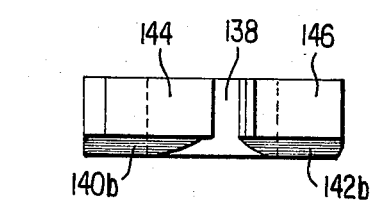
FIG. 10
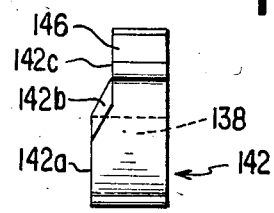
FIG. 12

MAGNETIC STRUCTURE FOR USE IN A CHAIN SAW OR EDGE TRIMMER IGNITION SYSTEM OR THE LIKE

BACKGROUND OF THE INVENTION

This invention relates to magneto ignition systems for use in chain saws, string trimmers, or the like, and, in particular, to improved magnetic structure for use in such systems.

Various ignition systems are known and disclosed in such patents as U.S. Pat. Nos. 4,120,277; 4,169,446; and 4,194,482, the foregoing patents being hereby incorporated herein by reference. These ignition systems are typically characterized by magnetic circuitry which includes a permanent magnet embedded in the periphery of a rotor or flywheel, the magnet acting in cooperation with a coil or coils disposed adjacent the flywheel such that rapid flux changes are induced within the coil each time the embedded magnet passes the coil. A permeable core structure is at least partially disposed within the coil to enhance the flux concentration therein. The coil is connected to ignition circuitry whereby the voltages induced in the coil are applied to the circuitry to effect actuation of a conventional ionization discharge device such as a spark plug.

The foregoing ignition systems are typically incorporated in hand held devices such as chain saws, string trimmers, lawn mowers, edgers, hedge trimmers, et al. Accordingly, these devices should be as light as possible to enhance the portability thereof. In known structures of the above type, magnets of a predetermined size have been employed together with associated pole piece structure where the size of the magnet has been determined by the amount of flux needed to generate appropriate flux changes in the coil of the ignition circuit.

In accordance with one object of this invention, it has been determined that the magnetic structure can be reduced in size or weight by twenty to twenty-five percent and, yet due to the improved magntic structure employed in the present invention, the requisite levels of flux are produced in the coil of the ignition circuit. This reduction in the weight of the magnet structure translates into enhanced portability of a chain saw or the like. Moreover, magnetic coupling between the improved magnetic structure of the present invention and the permeable core of the coil is enhanced thus resulting in a reduction in leakage flux between these elements as compared with prior art magnetic structures used in ignition systems and the like.

Typically, a plurality of fins are disposed around the flywheel periphery for cooling purposes where some of these fins are disposed above the embedded magnetic structure. However, due to the larger size of the magnetic structure employed heretofore, the size of the fins disposed above the magnetic structure has been rather small.

Accordingly, it is a further object of this invention to provide an improved magnetic structure of the above type wherein, due to the decreased size of the structure employed, larger fins may be employed on the flywheel in the area occupied by the magnetic structure to thus enhance the cooling effected by those fins and the overall cooling effected by the flywheel.

It is a further object of this invention to provide improved magnetic structures of the above type in conjunction with current sheet inductor ignition systems, as will be described in more detail hereinafter.

It is another object to employ the above improved magnetic structure in chain saws, string trimmers and the like.

Other objects and advantages of this invention will be apparent from a reading of the following specification and claims taken with the drawing.

BRIEF DESCRIPTION OF THE DRAWING

FIG. 4 is a plan view of an illustrative embodiment of an improved flywheel in accordance with the present invention.

FIG. 5 is a side elevation view of the flywheel of FIG. 4.

FIG. 6 is a partial cross sectional view taken on the line 6—6 of FIG. 5 together with a cross sectional view of a magnetically permeable core which cooperates with magnetic structures embedded in the flywheel.

FIGS. 7 and 8 are cross sectional views taken on the lines 7—7 and 8—8 of FIG. 4, respectively.

FIG. 9 is a side elevation view of an illustrative magnetic structure for use in the present invention including a magnet and its associated pole pieces.

FIG. 10 is a top plan view of the magnetic structure of FIG. 9.

FIG. 11 is a cross sectional view taken on the line 11—11 of FIG. 9.

FIG. 12 is an end view of the magnetic structure of FIG. 9.

DETAILED DESCRIPTION OF THE PREFERRED EMBODIMENTS OF THE INVENTION

Figure 1:
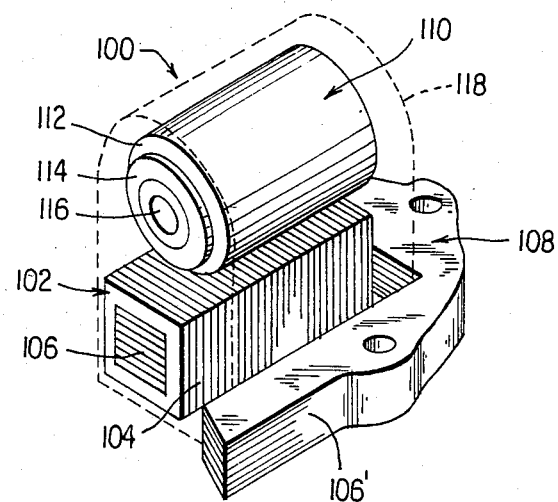
FIG. 1 is a perspective view of a magneto-type ignition system for a spark-ignition engine that utilizes a current sheet inductor network suitable for use with the magnetic structure of the present invention.

Reference should be made to the drawing where like reference numerals refer to like parts.

Figure 2:
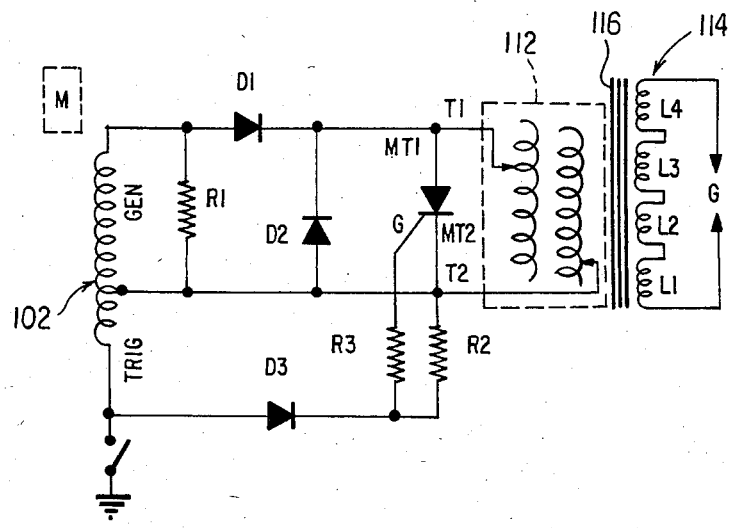
FIG. 2 is a circuit diagram of an illustrative ignition circuit employing the current sheet inductor network of FIG. 1.

The present invention may be employed with different types of magneto ignition systems such as those described in the aforementioned U.S. patents. One ignition system which the present invention is particularly suited for use with is illustrated in FIGS. 1 and 2. In this system, a current sheet inductor (CSI) network is employed, this network having first and second conductive sheets separated by and insulated from one another by a dielectric to provide capacitive and inductive coupling therebetween. Such a network is described in detail in copending U.S. application Ser. No. 479,742 in the name of the present applicant and assigned to the assignee of the present application. The foregoing application is incorporated herein by reference.

In FIG. 1, the ignition system 100 includes a charge generating and trigger coil 102 having a multi-turn winding 104 mounted on one leg 106 of a laminated, generally U-shaped, magnetic core 108, the other leg 106' of the core 108 serving to complete a below described magnetic circuit. A pulse-forming system 110 is disposed above the charge generating and trigger coil 102 as shown. The pulse-forming system 110 includes a CSI network 112, an inductive output coil 114, and a core 116 as shown in FIG. 2. The charge generating and trigger coil 102 and the CSI network 112 are interconnected by various electrical components, preferably mounted on a printed circuit board (not shown), with these components preferably encapsulated in an encapsulating material, as generally indicated at 118.

The ignition system 100 is typically mounted adjacent the outside diameter rim portion of an internal combustion engine flywheel, as discussed hereafter, which carries one or more permanent magnets past the pole faces of the laminated core 108 during each engine revolution to provide electrical energy to the ignition system through the charge generating and trigger coil 102 as explained below. The physical components of FIG. 1 and their cooperating electrical devices are interconnected as shown in the schematic diagram of FIG. 2. The CSI network 112 is represented in FIG. 2 by conventional inductor symbols adjacent to one another but not electrically connected. The output inductor coil 114 is shown as four serially connected subcoils $L_1$-$L_4$ and the magnetic core 116 is shown disposed intermediate the CSI network 112 and the output coil 114. The terminals T1 and T2 are shown as taps on each of the conductive strips to indicate that these terminals may be positioned intermediate the ends of their respective conductive strips to alter the ratio of the capacitive-/inductive characteristics. The terminals are positioned so that the electron flow in at least a portion of the conductive strips during discharge is in the same direction to provide magnetic field reinforcement as discussed above.

The charge generator and trigger coil 102 is shown as a tapped winding adjacent a schematically shown permanent magnet structure which, as is known in the art, sweeps past the charge generator and trigger coil with each engine revolution to induce an electrical flow into the coil. A coil portion GEN effects charge generation and a smaller portion of the coil TRIG effects trigger signal generation. One end of the charge generation portion of the coil GEN is connected to terminal T1 through a PN diode D1 while the other end of the coil GEN is connected to terminal T2 of the CSI network 112. A silicon controlled rectifier SCR1, having terminals MT1, MT2, and G, and a PN diode D2 are connected across the terminals T1 and T2 while a resistor R1 is connected across the charge generating portion GEN of the coil 102. The trigger circuit includes a PN diode D3 and a resistor R2 serially connected with the terminal MT2 of the SCR1 and a resistor R3 connected between the gate termianl G and the junction between the diode D3 and the resistor R2.

Figure 3:
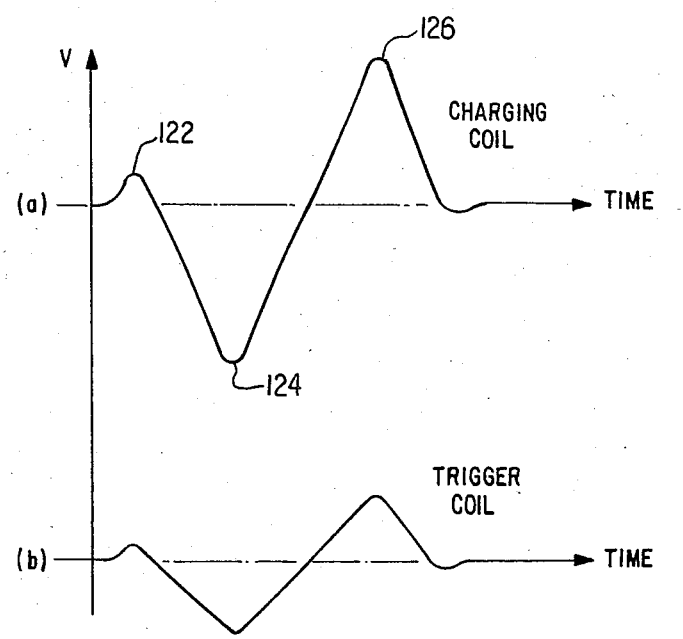
FIG. 3 is a graphical representation of the output of the pick-up coil of the ignition circuit of FIG. 2.

As shown in FIG. 3 and as will be further discussed below, the magnetic structure 120 which moves past the charge/trigger coil 102 with each revolution of the engine flywheel (FIG. 4) is designed to induce a current flow characterized by a leading positive alternation 122, a succeeding negative alternation 124, and a trailing positive alternation 126. As the magnetic structure 120 moves past the charge/trigger coil 102, the positive alternation 126 generates a positive voltage potential with the resistor R1 providing desired loading and the diode D1 rectifying the charge output so that the CSI network 112 accepts a charge; this charge being of sufficient magnitude to produce a desired output pulse. The time-varying nature of the electrical energy applied during charging is affected by the impedance of those components in circuit with the CSI network 112 so that any magnetic field produced during the application of the charge energy will be desirably less than that needed to induce a pulse in the output coil inductor 114. The CSI network will hold the charge until the magnet(s) passes coil 102 again, at which time the succeeding negative alternation 124 reverses the current output of the coil 102 with the diode D1 preventing discharge of the now-charged CSI network 112. The diode D3 is effective to rectify the trigger output of the trigger portion of the coil TRIG as magnetic structure 120 sweeps by to provide a gate trigger current to the gate G of the silicon controlled rectifier SCR1 with the trigger point determined by the resistive divider R2 and R3. When the gate current of SCR1 reaches its trigger level, the SCR1 goes into conduction to shunt the conductive strips together causing a transient discharge current flow which generates a rapidly changing magnetic field, the magnetic lines of flux of which are concentrated by the core 116 and cut through the turns of the output coil inductor 114 to generate the desired voltage pulse at the gap G. On the following positive alternation 126, the CSI network 112 is again charged as described above and holds that charge until the flywheel and its magnetic structure 120 passes the generator/trigger coil 102 on the next rotation of the flywheel. At this point, a leading positive alternation 122 will be available to provide additional energy at high speed to charge the CSI network 112, for example, were the CSI network not fully charged by the trailing positive alternation of the preceding set of alternations. In this manner, the circuit operates periodically to provide pulses to the spark gap.

The ignition system shown in FIGS. 1 and 2 is well suited for small gasoline powered, two-stroke engines such as those used in string trimmers, chain saws, lawn mowers, edgers, water pumps, hedge trimmers, electrical generators and the like. Moreover, CSI networks utilizing battery power can be provided in multi-cylinder engines, such as motor vehicle engines. A CSI network can be mounted on or connected to each spark plug with the application of charge energy and discharge triggering controlled by a central controller, such as a central electronic fuel-injection controller.

In addition to the ignition system applications described above, current sheet inductor pulse-forming networks and other ignition systems can be utilized in radar pulse formation and pyrotechnic ignition, for example.

Reference should now be made to FIGS. 4 through 12 which illustrate the improved flywheel and magnetic structure of the present invention. As can be seen in FIGS. 4 through 8, the improved flywheel 121 includes a body 123 having a central bore 125 extending therethrough for mounting on a motor shaft or the like (not shown). Mounted on and projecting from body 123 is a substantially tubular member 127 having small fin-like projections 128 extending from the periphery thereof, these projections inherently assisting in the cooling function. Moreover, the internal surface of projections 128 engage with a starter mechanism (not shown) disposed within tubular member 127.

Also extending from the peripheral area of body 123 are a plurality of fins 130, these fins also being used to effect cooling. The fins 130 may be subdivided into two groups namely groups 132 which are disposed over magnetic structures 120 embedded in the periphery of the flywheel at opposite sides thereof and groups 134 disposed in the remaining peripheral flywheel surfaces. As can be seen from FIGS. 7 and 8, the fins 132 have a smaller surface area than fins 134. Nevertheless, the area of fins 132 is increased with respect to prior art devices due to the smaller magnet structure 120 of the present invention. This is illustrated in FIG. 8 where the dotted line 136 illustrates the approximate height to which the prior art magnet structures extend. Thus, it can be seen the area of fins 132 above dotted line 136 corresponds to the surface area of the prior art fins disposed over the magnet structure 120 while the area of fins 132 disposed below dotted line 136 represent an increased area of these fins due to the smaller magnet structure of the present invention. Since this area increase applies to all of the fins 132 disposed over the magnet structure, a substantial increase in fin cooling capacity results.

Referring to FIG. 6, there is illustrated the relationship of the embedded magnetic structure 120, magnetically permeable core 108 where the coils and additional structure associated with the core are shown for ease of illustration. The magnetic structure 120 includes a magnet 138 where the magnet may typically be Alnico type VDG, and pole pieces 140 and 142 where the pole pieces are preferably made using powder metallurgy technology. As will be discussed in detail hereinafter, the pole pieces are asymmetrical in a plane perpendicular to flywheel 121 and are preferrably asymmetrical in the plane of the flywheel. The asymmetry of the magnetic structure 120 in the plane perpendicular to rotor 121 is best shown in FIGS. 9 through 12 which illustrate the assembled relationship of magnet 138 with its pole pieces 140 and 142. The pole pieces include wide, lower portions 140a and 142a, tapered intermediate portions 140b and 142b, and narrow, portions 140c and 142c, respecively. The upper surfaces 144 and 146 of pole pieces 140 and 142 respectively constitute the pole faces thereof with an air gap 145 (FIGS. 4 and 5) provided therebetween. As will be described further below, and as illustrated in FIG. 6, these pole faces are preferably asymmetrical, the area of pole face 144 being larger than that of pole face 146.

As can be seen in FIGS. 9 and 12, the lower portions 140a and 142a of the pole pieces contact the entire end surfaces 138a and 138b of magnet 138 to thereby optimize flux coupling between the magnet and its pole pieces. In particular, as can be seen in FIG. 9, the height of portions of 140a and 142a correspond to the height of magnet 138. Moreover, as can be seen in FIG. 11, the width of portions 140a and 142a corresponds to the width of magnet 138. As can be seen in FIGS. 11 and 12, the width of portions 140c and 142c is less than the width of portions 140a and 142a, these widths being in the axial direction of rotor 122 or, as stated before, in a plane perpendicular to the rotor. Due to the decreasing width of the pole pieces, the flux generated therein by magnet 138 is concentrated as it approaches and emanates from pole faces 144 and 146. Because of this flux concentration, it is possible to employ a smaller magnet 138 than has heretofore been employed. That is, heretofore, the size of magnet 138 has been determined by the amount of flux change needed in core 108 in order to generate signals of sufficient size for its associated ignition circuitry. Typically, there has been no decrease in the width of the prior art pole pieces in the axial direction of the rotor and thus no flux concentration as now provided by the present invention. Due at least partially to the flux concentration provided by the present invention, the magnet 138 can be made twenty to twenty-five percent smaller in volume or weight and yet sufficient flux is generated in core 108 to ensure flux changes of an appropriate amount for the associated ignition circuitry. The reduction in magnet size results in decreased weight of the rotor and, of course, the equipment within which the rotor is incorporated. Since this equipment is typically portable, any decreases in weight that can be effected are particularly significant.

Moreover, the width of core 108 can also be decreased because of the reduced flux leakage which occurs because of the decreased area of polepieces 140 and 142 including the reduced area of their respective pole faces 144 and 146. That is, the increased flux concentration which results from the decreased area of the polepieces 140 and 142 also results in less flux leakage and thus more flux coupling between pole pieces 140 and 142 and core 108.

There has been at least one prior art device which has employed an embedded magnet structure in a flywheel where the width of the pole pieces was larger at points within the periphery than at points on the periphery, the purpose of this configuration being to provide means for holding the pole pieces within the flywheel. However, no advantage was taken in these devices of enhanced flux concentration to decrease the magnet size and thus realize the various advantages of the present invention as described above.

Having now described the asymmetry of the pole pieces 140 and 142 in the plane perpendicular to that of the rotor, the asymmetry of the pole pieces in the plane of the rotor will now be discussed. Generally speaking, the surface of pole face 144 is preferably larger than that of pole face 146 where the width of the pole faces is typically the same while the length of pole face 144 along the periphery of flywheel 121 is greater than that of pole face 146. Hence, these pole faces are asymmetrical in the plane of the rotor. As can be seen in FIG. 6, the flywheel 121 rotates in the direction of the arrow. When the leading edge 152 of portion 140c of pole piece 140 passes the edge 109 of leg 106 of core 108, positive alternation 122 (FIG. 3) commences. As the flywheel 121 continues to rotate, more flux will be transmitted from the pole piece 144 to leg 106 whereby the alternation 122 is generated. As long as pole face 144 remains under leg 106, the alternation 122 will be generated.

With respect to the generation of negative alternation 124, it should be noted phantom line 150 represents the center line of leg 106 of core 108 and, consequently the center line of the coil 102 wound on leg 106, the coil being preferably symmetrically wound on the leg. A gap 155 is provided between pole pieces 140 and 142. When the center of the gap moves past central axis 150 of coil 102, the flux in leg 106 rapidly changes direction to generate negative alternation 124. While the pole pieces 144 and 146 remain under leg 106 of core 108, the flux in the leg remains substantially constant. As soon as the trailing edge 158 of portion 142c moves from under the coil and passes from the trailing edge 109a of leg 106, the flux again rapidly changes direction to generate the second positive alternation 126. The generation of the two positive and one negative alternations is repeated each time one of the magnetic structures 120 moves under coil 102.

Referring to FIG. 6, it should be noted trailing edge 154 of pole piece 140 and leading edge 156 of pole piece 142 are in substantial parallelism and are inclined with respect to a radial extending through the center of the bore 125 of the flywheel. Line 154a represents such a radial line while line 154b is aligned with edge 154 of pole piece 140. The angle $\alpha$ is the angular inclination of the edges 154 and 156 with respect to radial 154a. The angle α is preferably greater than ten degrees whereas leading edge 152 of pole piece 140 and the trailing edge 158 of pole piece 142 are preferably in substantial alignment with flywheel radials. Thus, when edges 152 and 158 pass the center line 150 of coil 102 (which also preferably extend along a flywheel radial), they will be in substantial alignment with the center line whereas the edges 154 and 156 of gap 155 will be inclined at the angle α with respect to the center line. Typically, the edges 152 and 158 should be inclined no more than five degrees with respect to center line 150 when they pass this line whereas the edges 154 and 156 should be greater than plus or minus ten degrees. That is, as viewed in FIG. 6, the angle is assumed to be positive and at least ten degrees. However, the inclination of the edges 154 and 156 may be opposite to that shown in FIG. 6 such that the line 154b is on the side opposite to line 154a to that shown in FIG. 6 so that α would assume a negative value of at least minus ten degrees.

Although shown as asymmetrical in the plane of the rotor in FIG. 6, pole pieces 140 and 142 may be symmetrical in this plane whereby the surface areas of faces 144 and 146 would be substantially equal and where the edges 154 and 156 would be substantially aligned with radials passing through the center of the flywheel. However, as stated above, the asymmetrical arrangement of FIG. 6 is preferred. Thus, as long as the pole pieces are asymmetrical in the plane perpendicular to the rotor, significant reduction in the sizes of magnet 138 and core 108 can be realized. The asymmetry in the plane perpendicular to the rotor is typically such that the widths of portions 140c and 142c is about seventy to eighty percent of the widths of portions 140a and 142a respectively. In general the reduction in width of the pole pieces in the plane normal to the rotor plane should be such that the resulting flux concentration is sufficient to compensate for the reduction in size of magnet 138 in such a manner that the energy in alternations 124 and 126 is still sufficient to effect the requisite charging and triggering functions required by the ignition circuitry.

It is to be understood that the above detailed description of the various embodiments of the invention is provided by way of example only. Various details of design and construction may be modified without departing from the true spirit and scope of the invention as set forth in the appended claims.

What is claimed is:

1. In a magneto ignition system including a flywheel lying in a plane having an axis of rotation perpendicular to said plane of the flywheel and at least one magnetic structure embedded in the periphery thereof, a magnetically permeable core disposed adjacent said flywheel, a coil wound on said core and connected to an ignition circuit so that a voltage waveform is induced in said coil and applied to said circuit each time the magnetic structure passes the coil, said waveform having at least a first positive alternation followed by a negative alternation and then a second positive alternation and where said magnetic structure includes (a) a magnet having first and second end faces and (b) first and second pole pieces where said pole pieces have (i) first portions which respectively engage said end faces and (ii) second portions which respectively include pole faces on said flywheel periphery, the improvement comprising:

said pole pieces being assymetrical in a plane perpendicular to the plane of the flywheel such that the said second portions of the pole pieces have a width in the direction of the axis of rotation of the flywheel in said perpendicular plane which is less than the width in the direction of the axis of rotation of the flywheel in said perpendicular plane of the said first portions thereof to thereby effect concentration of the flux produced by said magnet at said pole faces to thereby permit a reduction in the size of the magnet without substantially lessening the energy in said negative and second positive alternations of the voltage waveform applied to the ignition circuit.

2. The improvement as in claim 1 where the width of said second portions of the pole pieces is about seventy to eighty percent of the width of said first portions.

3. The improvement as in claim 1 where said second portions of the pole pieces completely respectively cover said end faces of the magnet.

4. The improvement as in claim 1 where said pole pieces are made using powder metallurgy technology.

5. The improvement as in claim 1 where said ignition circuit includes an element having inductive and capacitive properties, a switch associated with said element, and a spark gap inductively coupled to said element where at least said second positive alternation charges said element and said negative alternation causes said switch to discharge the element to thereby effect inductive coupling of a sparking voltage to said spark gap.

6. The improvement as in claim 5 where said element includes at least first and second conductive sheet means separated by and insulated from one another by a dielectric means to provide capacitive and inductive coupling therebetween.

7. The improvement as in claim 1 where said flywheel rotates in a predetermined direction and where said pole face of said first pole piece passes said core prior to the pole face of the second pole piece, said pole pieces being asymmetrical in the plane of the rotor such that the pole face of the first pole piece is larger in area than the pole face of the second pole piece.

8. The improvement as in claim 7 where said coil has a central axis and said second portion of the first pole piece has a leading edge which moves past said core first and a trailing edge and where said second portion of the second pole piece also has a leading edge which moves past the core first and a trailing edge, there being a gap between the trailing edge of the first pole piece and the leading edge of the second pole where the latter two edges are both inclined at an angle of at least plus or minus ten degrees with respect to said central axis of the coil as said edges pass the axis.

9. The improvement as in claim 7 where the trailing edge of the second pole piece is inclined at an angle no greater than plus or minus five degrees with respect to said central axis as said latter trailing edge passes the central axis.

10. The improvement as in claim 1 where said flywheel has a plurality of cooling fins disposed around the periphery thereof where at least some of said fins are disposed adjacent the portion of the flywheel in which said magnet is embedded, the remaining fins being disposed at the remaining peripheral areas of the flywheel said reduction in the size of said magnet resulting in an increase in the surface area of said same fins to thus enhance the cooling capacity of the flywheel.

11. The improvement as in claim 1 where at least two of said magnetic structures are embedded in the periphery of said flywheel.

12. The improvement as in claim 1 where said magneto ignition system is incorporated in a chain saw.

13. The improvement as in claim 1 where said magneto ignition system is incorporated in a string trimmer.

14. In a magneto ignition system including a flywheel having at least one magnetic structure embedded in the periphery thereof, a magnetically permeable core disposed adjacent said flywheel, a coil wound on said core and connected to an ignition circuit so that a voltage waveform is induced in said coil and applied to said circuit each time the magnetic structure passes the coil, said waveform having at least a first positive alternation followed by a negative alternation and then a second positive alternation and where said magnetic structure includes (a) a magnet having first and second end faces and (b) first and second pole pieces where said pole pieces have (i) first portions which respectively engage said end faces and (ii) second portions which respectively include pole faces on said flywheel periphery, the improvement comprising:

said flywheel rotating in a predetermined direction where said pole face of said first pole piece passes said core prior to the pole face of the second pole piece, said pole pieces being asymmetrical in the plane of the rotor such that the pole face of the first pole piece is larger in area than the pole face of the second pole piece and where said coil has a central axis and said second portion of the first pole piece has a leading edge which moves past said core first and a trailing edge and where said second portion of the second pole piece also has a leading edge which moves past the core first and a trailing edge, there being a gap between the trailing edge of the first pole piece and the leading edge of the second pole piece where the latter two edges are both inclined at an angle of at least plus or minus ten degrees with respect to said central axis of the coil as said edges pass the axis.

15. The improvement as in claim 14 where the trailing edge of the second pole piece is inclined at an angle no greater than plus or minus five degrees with respect to said central axis as said latter trailing edge passes the central axis.

16. The improvement as in claim 14 where said pole pieces are asymmetrical in a plane perpendicular to the plane of the flywheel such that the said second portions of the pole pieces have a width in said perpendicular plane which is less than the width of the said first portions thereof to thereby effect concentration of the flux produced by said magnet at said pole faces to thereby permit a reduction in the size of the magnet without substantially lessening the energy in said negative and second positive alternations of the voltage waveform applied to the ignition circuit.

17. The improvement as in claim 14 where said magneto ignition system is incorporated in a chain saw.

18. The improvement as in claim 14 where said magneto ignition system is incorporated in a string trimmer.

19. In a flywheel lying in a plane having an axis of rotation perpendicular to said plane of the flywheel and a plurality of cooling fins disposed around the periphery thereof where at least some of said fins are disposed adjacent a portion of the flywheel in which a magnetic structure is embedded, the remaining fins being disposed at the remaining peripheral areas of the flywheel, there being a magnetically permeable core disposed adjacent said flywheel, a coil wound on said core and connected to an ignition circuit so that a voltage waveform is inducted in said coil and applied to said circuit each time the magnetic structure passes the coil, said waveform having at least a first positive alternation followed by a negative alternation and then a second positive alternation and where said magnetic structure includes a magnet having first and second pole pieces where said pole pieces have (i) first portions which respectively engage said end faces and (ii) second portions which respectively include pole faces on said flywheel periphery, the improvement comprising:

said pole pieces being assymetrical in a plane perpendicular to the plane of the flywheel such that the said second portions of the pole pieces have a width in the direction of the axis of rotation of the flywheel in said perpendicular plane which is less than the width in the direction of the axis of rotation of the flywheel in said perpendicular plane of the said first portions thereof to thereby effect concentration of the flux produced by said magnet at said pole faces to thereby permit a reduction in the size of the magnet without substantially lessening the energy in said negative and second positive alternations of the voltage waveform applied to the ignition circuit, said reduction in the size of said magnet resulting in an increase in the surface area of said same fins to thus enhance the cooling capacity of the flywheel.

20. The improvement as in claim 19 where the flywheel is incorporated in a chain saw.

21. The improvement as in claim 19 where said flywheel is incorporated in a string trimmer.

* * * * *

UNITED STATES PATENT AND TRADEMARK OFFICE
CERTIFICATE OF CORRECTION

PATENT NO. :   4,603,664
DATED      :   August 5, 1986
INVENTOR(S) :  Robert V. Jackson It is certified that error appears in the above-identified patent and that said Letters Patent is hereby corrected as shown below:

Column 4, line 20, delete "G" and insert --GAP--.

Column 5, line 51, delete "rotor 122" and insert --rotor 121--.

Please change Fig. 2 to show:

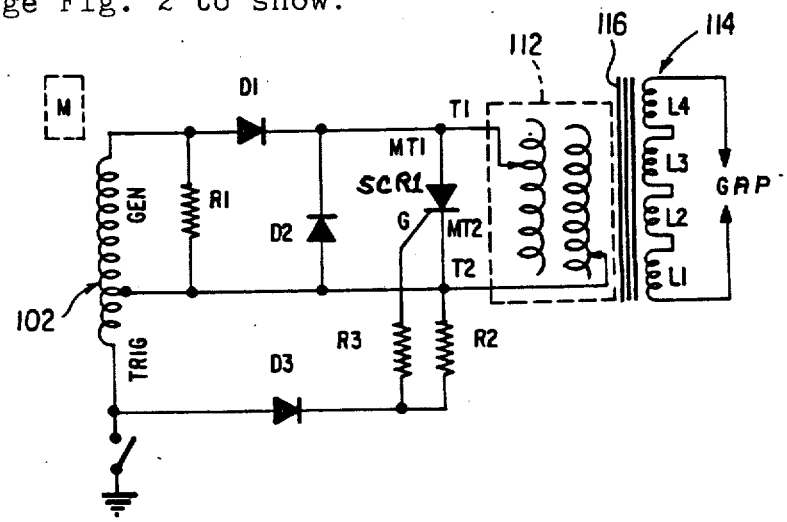

FIG. 2

Signed and Sealed this

Twentieth Day of January, 1987

Attest:

DONALD J. QUIGG

Attesting Officer

Commissioner of Patents and Trademarks